(No Model.)
J. EVANS.
WHEEL TIRE.
No. 391,037. Patented Oct. 16, 1888.
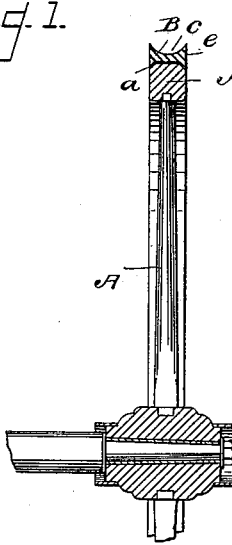
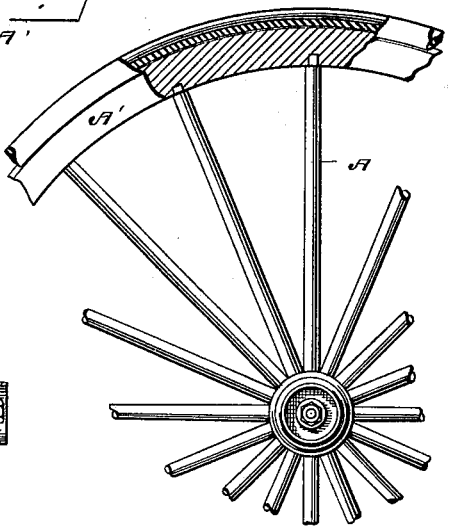
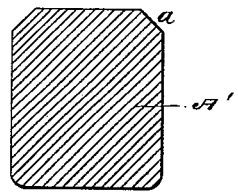
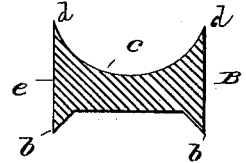
WITNESSES:
Geo. G. Penner.
Wm. J. Gelston.
INVENTOR.
Joseph Evans,
By E. H. Gelston,
ATTORNEY.

UNITED STATES PATENT OFFICE.

JOSEPH EVANS, OF POCAHONTAS, VIRGINIA.

WHEEL-TIRE.

SPECIFICATION forming part of Letters Patent No. 391,037, dated October 16, 1888.

Application filed March 10, 1888. Serial No. 266,860. (No model.)

*To all whom it may concern:*

Be it known that I, JOSEPH EVANS, a citizen of the United States, residing at Pocahontas, in the county of Tazewell and State of Virginia, have invented certain new and useful Improvements in Wagon-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in wagon-tires; and it consists of a tire having its inner surface formed with an annular projecting flange and its outer surface formed concave, the objects of my invention being to provide a wagon-tire that will remain in place after the felly of the wagon-wheel has shrunk to form a concave outer bearing-surface, sharp edges on the periphery to permit of even tread, and reduce the friction and draft to the minimum. I attain these objects by means of the peculiar construction and arrangement of the parts of my invention, which will be hereinafter described and claimed, reference being had to the drawings accompanying this application, and forming part of the same, in which—

Figure 1 is an elevation of a portion of a wheel, partly in section, showing the relative location of my invention. Fig. 2 is a side elevation of a broken wheel with a portion of the rim removed. Fig. 3 is a transverse section of a felly adapted to the attachment of my invention, and Fig. 4 is a cross-section of my improved tire.

Similar letters refer to like parts throughout the drawings.

Referring to the drawings, A represents a wagon-wheel having a felly, A', with beveled edges $a$ on its outer face.

B represents a tire formed of metal and its inner edges flanged outward at $b$ to fit over the beveled edges $a$ formed on said felly. The outer face of said tire B is formed concave centrally around its entire periphery, as shown at $c$, said concavity terminating in sharp edges $d$ at each side of said tire. The side of said tire B in line with the outer and inner face of the felly A' is formed with a plain surface, $e$. This construction of wagon-tire forms an even and unvaried tread, as by use the concave outer surface wears evenly and keeps the edges sharp, while the friction is reduced to the lowest minimum, thereby lessening the draft; also, the vehicle is prevented from sliding sidewise by reason of the sharp edges of the tire penetrating the ground and making a grip.

With the ordinary flat tire for wagons, by use the outer edges of the tire are worn away and the outer surface of the tire is worn round and the felly is bruised and becomes loose. The rounded tire sinks into the ground when in use, causing great friction and greatly increasing the draft. With my invention all of these difficulties and defects are overcome. The tire is more serviceable and can be worn until the concave surface is worn nearly through to the felly.

My construction of tire may be shrunk onto the fellies in the usual way and secured by bolts, if so desired.

The use of my invention effects an obviation of the side draft, in consequence of the tire wearing round on the corners, and maintains the tire on the wheel despite varying circumstances or conditions.

I am aware that the patent granted on the 24th day of August, 1869, to Dodder, No. 93,973, measurably accomplishes a similar purpose; but therein the arc of concavity of the upper surface does not extend to the lateral termini of the tire, (as in my invention,) nor is the lower surface horizontal with tapering projections, as claimed by me. I am likewise aware that the patent granted on the 5th day of October, 1871, to Righter, No. 121,663, aims in the same general direction. Therein, however, there are two upper concave surfaces, whereas my invention has only one. The lower surface of this tire is similar to mine, except that it is centrally hollowed, whereas mine is uniformly horizontal. I am further aware that the patent granted on the 9th day of November, 1886, to Hess, No. 352,187, assimilates my construction. The differences are that therein the termini of the upper concave surface are obtuse, whereas mine are sharp and pointed; also, the under surface therein shown is centrally concaved, whereas mine is uniformly horizontal. These structural differences not only greatly economize the production of these tires, but increase their durability and utility.

Having thus described my invention, what I claim, and desire to secure by Letters Patent, is—

As a new article of manufacture, a wagon-tire whose lower surface is uniformly horizontal, terminating in either direction in equal inclined flanges $b$, which are in the same vertical plane with the pointed termini $d$, that constitute the antipodal ends of the upper uniformly-concave surface, $c$, every portion of which is in the arc of a common circle, for the purpose set forth.

In testimony whereof I affix my signature in presence of two witnesses.

JOSEPH EVANS.

Witnesses:
E. D. FRAZIER,
JAS. F. BEAVERS.